US006118094A

United States Patent [19]
Hoy

[11] Patent Number: 6,118,094
[45] Date of Patent: Sep. 12, 2000

[54] ARC DEBURRING OF ELECTROCHEMICAL CELL ELECTRODES

[75] Inventor: Wesley D. Hoy, Gainesville, Fla.

[73] Assignee: Eveready Battery Company, Inc., St. Louis, Mo.

[21] Appl. No.: 09/239,709

[22] Filed: Jan. 28, 1999

[51] Int. Cl.[7] .................................................. B23K 9/013
[52] U.S. Cl. ...................................... 219/69.1; 219/69.17
[58] Field of Search ........................ 219/69.1, 68, 69.11, 219/69.17

[56] References Cited

U.S. PATENT DOCUMENTS

| | | | |
|---|---|---|---|
| 3,937,915 | 2/1976 | Matsuo et al. | 219/68 |
| 4,251,603 | 2/1981 | Matsumoto et al. | |
| 4,308,446 | 12/1981 | Okane et al. | |
| 4,957,543 | 9/1990 | Babjak et al. | |
| 5,986,231 | 11/1999 | Okuya | 219/69.17 |

FOREIGN PATENT DOCUMENTS 55-30386  3/1980  Japan .

*Primary Examiner*—Geoffrey S. Evans
*Attorney, Agent, or Firm*—Linda Gebauer; Robert W. Welsh

[57] ABSTRACT

Method and apparatus for deburring conductive articles such as electrochemical cell electrodes prior to their assembly into completed cells. An electrode substrate is passed in a continuous motion between two discharge elements between which a high voltage potential is produced sufficient to arc a gap between the discharge elements and burrs on the edges of the substrate. A shaped discharge surface is provided to ensure arcing to burrs having a variety of orientations. The current and frequency of the power supply providing the arcing current are selected and controlled to distribute the deburring energy over the length of the substrate. By so doing, deburring is accomplished with minimized damage to the substrate and without producing additional burrs. Preferably, the frequency of the discharge current at least matches the frequency at which burrs pass the discharge elements.

27 Claims, 3 Drawing Sheets

ARC DEBURRING OF ELECTROCHEMICAL CELL ELECTRODES

BACKGROUND OF THE INVENTION

The present invention pertains to techniques in fabricating electrochemical cell electrodes. In particular, it is methods of removing burrs or other unwanted projections from the edges of electrode substrates. Electrochemical cells, particularly secondary cells, often use discrete electrodes fabricated by deposition of electrochemically active materials onto conductive substrates. These substrates are typically in the form of a thin flexible sheet of solid or porous metal. The function of the substrate is to retain the electrode active material in a configuration having a maximized surface area and to act as a current collector. Electrodes made in this manner are assembled in various ways to form an electrochemical cell. A configuration predominantly used in popular commercial cell designs is commonly known as a jelly-roll assembly. In this configuration, positive and negative electrodes fabricated on thin sheet substrates are laid back-to-back with interposed nonconductive separators. The electrodes are then wound into a cylindrical shape. This "jelly-roll" assembly is then inserted into a canister, connected to terminals, and permeated with an electrolyte. The separators are typically made as thin as possible to maximize the active volume and capacity of the cells. As a result, a recurring problem in these assemblies is electrical shorting through the separator between adjacent positive and negative electrodes. One factor in this mode of failure is the existence of rough edges or burrs on the electrode substrates. During winding and compression of the jelly-roll assembly, these burrs are pressed into the separator and penetrate it to create a short to the facing electrode. Failure of the cell may result. This problem is particularly found in cells using porous metal substrates.

Electrodes in some cells use porous or foam nickel metal substrates. The porous metal is a thin three-dimensional matrix of interconnected filaments or fibers. Porosity is typically in the range of 90 to 95 percent. These structures are discussed in detail in U.S. Pat. Nos. 4,957,543 to Babjak et al. and 4,251,603 to Matsumoto el al. The benefit of the porous metal substrate is the ability to deposit and capture electrode active material within the substrate matrix. However, these substrates are typically cut from larger sheets of stock porous metal. In the process of cutting, many of the metal filaments are cut between their interconnections resulting in filament points or burrs. The cut edges of the substrate have a multitude of these burrs. When these substrates are formed into a jelly-roll assembly, the filament burrs may easily penetrate the separators causing shorts. To prevent this, substrates must be deburred to remove the filament burrs back to a filament interconnection thereby eliminating the penetrating points. This must be done without destroying more matrix interconnections and in the process creating new burrs.

Prior methods of deburring porous metal substrates include low voltage electric deburring typical of deburring methods in other technologies. In those methods, a low voltage potential (15–20 volts direct) is created between the substrate edge and a contact surface. The substrate is pressed into contact with the surface, completing a deburring circuit. The relatively high current (15–30 amperes) removes the burrs by a combination of fusing and vaporizing the metal. By translating the substrate edge across the contact surface while maintaining contact, a fairly smooth edge may be produced. This method of contact deburring has significant disadvantages including sticking of the substrate edge to the contact surface. For this reason and others, contact deburring is not effective in a high volume production environment.

What is needed is a method of deburring porous metal substrates in which the filament burrs can be quickly and easily removed without damaging the substrate body or creating new burrs. Such a method should be easily integrated into current methods of a fabricating cell electrodes and electrode assemblies.

SUMMARY OF THE INVENTION

The present invention solves the problem of effective deburring of metal electrode substrates by introducing the application of a high voltage and low current deburring circuit. By creating a controlled electric arc between a discharge element and the burrs on a substrate edge, the burrs may be removed without damaging the substrate body. The arc is repeated at a frequency to distribute the deburring energy to the burrs along the length of the substrate. By deburring with an arc, without physical contact, many of the problems with previous methods are eliminated or avoided.

An object of the present invention is a method of deburring porous metal electrode substrates without damaging the substrate body.

A further object of the present invention is a method of arc deburring electrode substrates using a high voltage power supply that provides a low current arc that erodes burrs in an incremental fashion.

Another object of the present invention is a noncontact method of simultaneously deburring opposite side edges of electrode substrates.

Yet another object of the present invention is a deburring device and method which are easily integrated into electrode fabrication processes.

The present invention provides a method and device for controlling the application of electrical energy to the edge of a substrate so that burrs present on the edge are removed while the substrate is not damaged. This is accomplished by creating an electrical potential that, due to the voltage overcoming an intervening air gap resistance, arcs from a discharge element to the substrate edge. The relatively thin burrs extend from the substrate edge and provide a lower resistance path for the arc current. The energy of the arcing discharge removes at least a portion of the burr mass by various reactions including ionization. By providing a limited current and discharge energy the amount of mass removed is limited to the mass of the burr or less. In this way damage to the underlying substrate is minimized. The electrical potential is repeatedly applied to the discharge elements to produce individual discharges for each individual burr. In one embodiment, this is accomplished by moving the substrate burred edges continuously past the discharge elements. The speed of this passage and the spacing or number of burrs results in the burrs being exposed to the discharge elements at a particular average frequency. By matching the electrical potential to this burr frequency, individual arcs are provided to individual burrs. By increasing the electrical frequency above the burr frequency and reducing the individual discharge energy, the burrs are removed incrementally—piece by piece. Increasing the arcing frequency is seen as analogous to using finer sandpaper to more gradually smooth an object. The benefit is reduced incidental "scratching" of the substrate.

The required voltage for arcing or discharge is determined by the air gap between the discharge elements and the substrate edges. In one embodiment a substrate is passed between a pair of discharge elements such that a gap exists on both sides of the substrate. The discharge potential bridges this double gap. A power supply is provided to create the required voltage. The power supply is selected to provide, or its output is adjusted to provide, the proper frequency power. At the same time, the power supply current delivery is controlled or limited to provide only the discharge energy required to remove burrs. If too much energy is delivered, the burrs will be burned off and the substrate also damaged. The approximate proper current is determined from the discharge voltage and burr mass to be removed and verified experimentally. For deburring many typical nickel metal foam substrates a common power supply is effective and readily available.

These methods are particularly applicable to deburring objects having regularly spaced burrs. This includes porous or foam metal electrochemical cell electrode substrates. In an example device, a substrate is pushed along a path between, and equally spaced from, two discharge elements. A shuttle is provided to push and control the substrate movement. The discharge elements preferably have a discharge surface that is shaped and located to be, at all points on the surface, equally distant from the path of the substrate edges. This discharge surface increases arcing preferentially to the burr. In alternative configurations multiple discharge elements or subelements are employed at each edge of the substrate.

The above methods are also used to carryout one-edge deburring. Where only one edge of a substrate is to be deburred (or preferentially deburred) the discharge elements adjacent the opposite edge are positioned as close as possible to the substrate to minimize the gap. By minimizing the gap dimension on one side the arcing voltage and energy is reduced to reduce the deburring effect. Deburring occurs predominantly on the side having a larger gap. By physically connecting substrates to one lead or pole of a supplied voltage, one-edge and two-edge deburring are also accomplished in alternative embodiments.

Embodiments of the present invention have advantages in commercial production of electrochemical cell electrodes. No physical electrical connection with the substrate edge need be made. The discharge current passes between the discharge elements by passing through the substrate. As well, because the substrate need not physically touch the discharge elements, movement of the substrate is more free. These deburring methods may be used on cell electrodes after active materials have been deposited on the substrate. These characteristics simplify incorporating the deburring process into electrode fabrication processes.

The present invention provides novel methods and devices for deburring conductive objects such as electrochemical cell electrodes and substrates. A fuller understanding of the invention and its novel aspects can be obtained from the following figures and detailed examples.

DESCRIPTION OF THE PREFERRED EMBODIMENTS

Prior methods of arc deburring metal articles generally operate at relatively low voltage and relatively high current. This is, in part, because the particular point of application of the deburring arc is not as important as the quick gross removal of a quantity of solid matter from the object. In the present invention, control of the point of application of the deburring current is important. Secondary cell electrode substrates are thin: in a range of about 0.020 to 0.050 inch (0.51 to 1.27 mm) for a typical porous metal substrate. Burrs on these electrodes are located over the extent of edge dimensions relatively large in comparison to these thicknesses: for a typical "AAA" cell, side edge dimensions are approximately 1.5 inches (38.1 mm). Particularly with porous metal substrates, the body of the substrate (filaments) in the proximity of the burrs (filament ends) are of no greater cross-section or mass than a burr. If the deburring current arcs to a point between protruding burrs, or if too much current is applied at any one point, it is possible that substrate body filaments will be severed with the ends forming new burrs. As a consequence, successful deburring requires the deburring energy be distributed over the length of the edge and be substantially directed to the burrs and away from the substrate body to prevent production of new burrs.

In the present invention this is accomplished by passing a burred substrate between a pair of discharge elements having a high voltage potential but allowing only a relatively low current discharge. The gaps between the substrate and discharge elements are bridged by an arc that takes a path of least resistance—through the projecting burrs. The electrical energy is in part expended to erode the burrs. If the voltage is properly controlled, arcing will occur predominantly to the protruding burrs. By controlling the arcing current, the burrs can be removed without significant damage to the adjacent substrate body. The current is controlled by providing a limited current alternating power supply. The voltage is supplied at a frequency sufficiently high to effectively distribute the deburring energy over the length of the substrate edge. This is explained in more detail below with respect to the example deburring system shown in FIGS. 1 and 2a,b.

Figure 1:
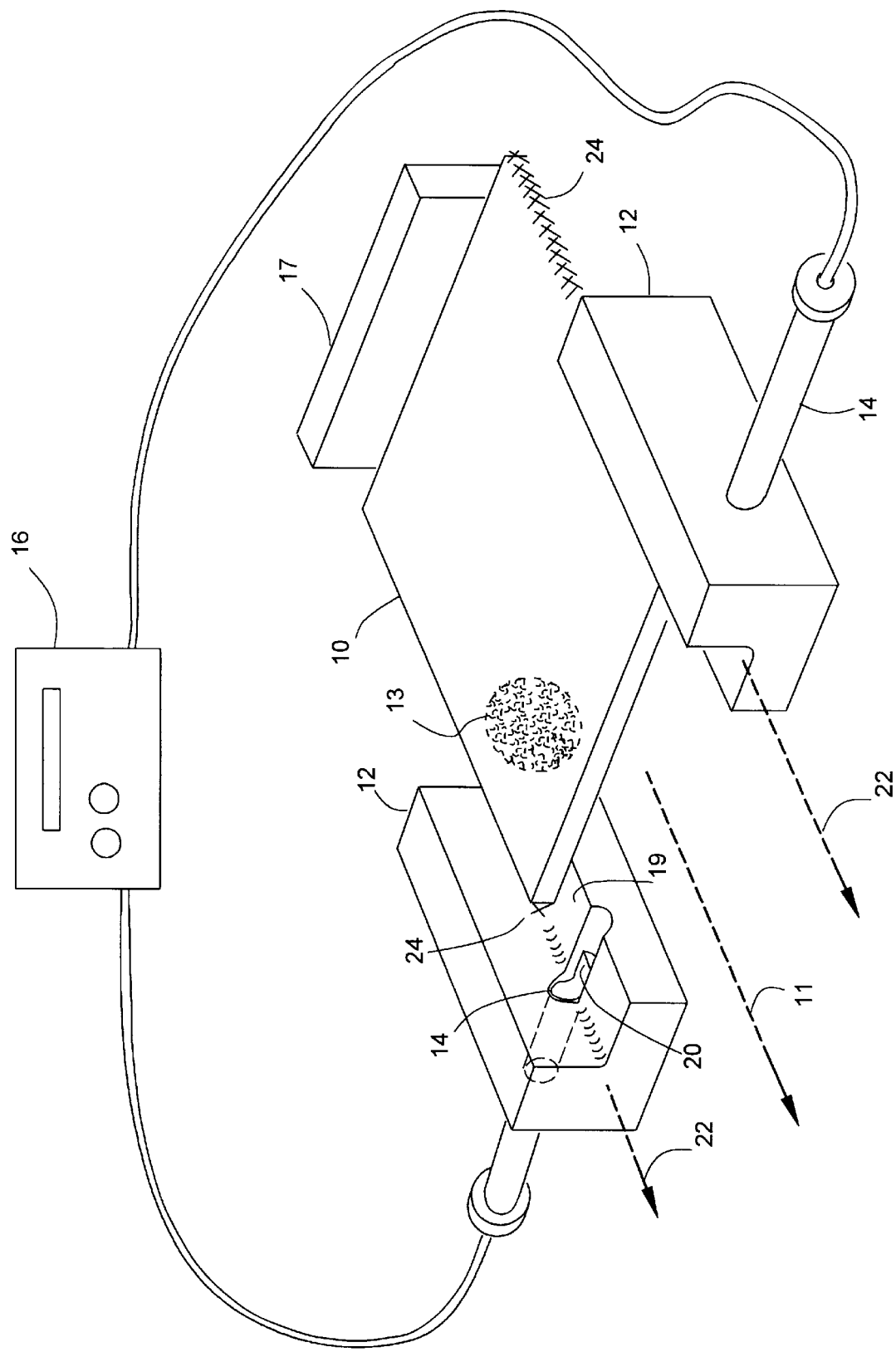
FIG. 1 is perspective view of a deburring station employing one embodiment of the present invention to deburr foam nickel metal electrochemical cell electrodes.
Figure 2A:
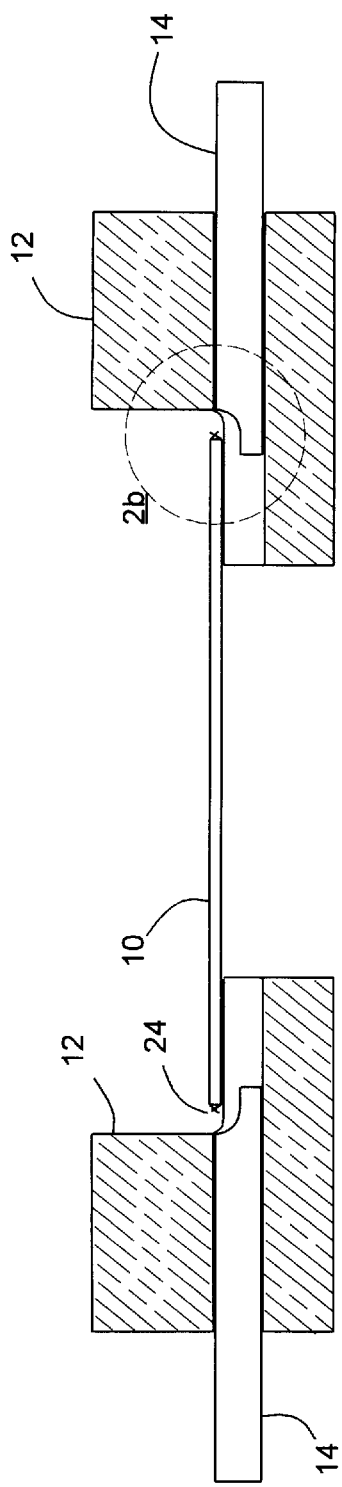
FIGS. 2a and 2b are cross section views of the embodiment shown in FIG. 1, looking along the path of the electrode substrate between the discharge electrodes.
Figure 2B:
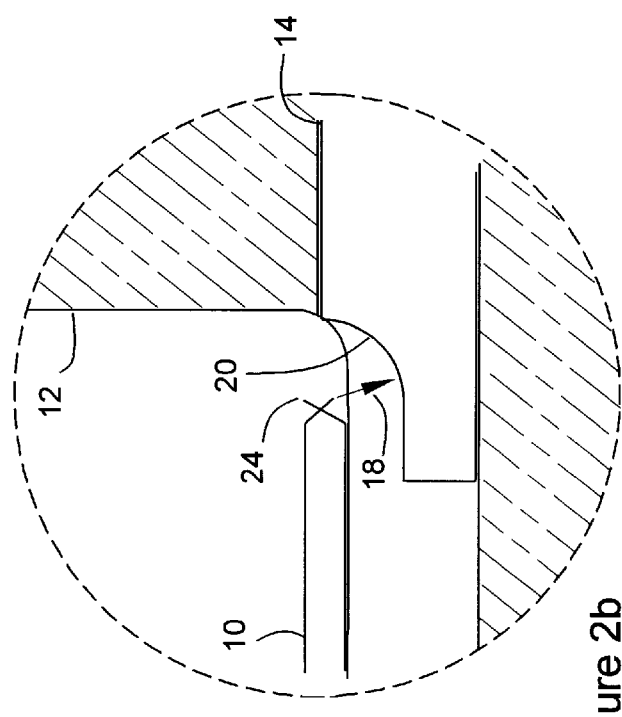

FIGS. 1 and 2a,b are views of a deburring station according to one embodiment of the present invention. In FIG. 1, a porous nickel metal substrate 10 is being moved between two transfer bars 12 along a straight deburring path 11. The substrate 10 is shown in rough outline with the typical random filament pattern 13 of the foam metal matrix indicated. The transfer bars 12 must be formed of a high dielectric material as their function is to retain in fixed position discharge elements 14. The discharge elements 14 are connected to a power supply 16 that will be detailed below. The substrate 10 is pushed between the transfer bars 12 by a shuttle 17 (of high dielectric material) connected to a drive mechanism. Satisfactory materials for the transfer bars and shuttle will be known to those skilled in fabrication of high voltage equipment and components. These materials include ceramics, PTFE based materials and plastics having high dielectric properties. The shuttle 17 and drive move the substrate 10 on the deburring path 11 at a predetermined rate while maintaining the substrate edges equally distant from the two discharge elements. The substrate 10 is supported on opposite edges by a ledge 19 integral to each of the transfer bars 12. As the substrate 10 slides along the ledge 19 and passes the discharge elements 14, it comes within a discharge gap distance 18 (FIG. 2b) of discharge surfaces 20 formed on the end of the discharge elements 14. Vertical separation of the substrate 10 and discharge surfaces 20 is maintained by recessing the discharge surfaces 20 below the supporting surface of the transfer bar ledges 19. The discharge surfaces 20 are preferably shaped to be at all points on the surface approximately equally distant from a path or line of travel 22 on the approximate centerline of the burr ends. In this manner, arcing to burrs 24 extending from the substrate edge and on the line of travel 22 is increased while the probability of arcing to the substrate body is reduced. The shaped discharge surfaces are particularly necessary because of the nature of the burrs on porous metal substrates; the burrs may extend in a variety of directions. Discharge from a localized point would be less likely to form an arc to all burrs on an edge. The shape of the discharge surfaces 20 and relative position of the substrate edge is shown in FIG. 2b, a cross section detail view of the deburring station. The discharge elements may be formed of any of a variety of materials appropriate for this purpose such as tungsten. In alternative configurations, each discharge element is made up of two or more subelements. Each subelement is connected to a common power supply such as to each carry the same potential. The subelements may be positioned relatively together to form essentially a single discharge position or may be positioned spaced apart. In one alternative, multiple discharge elements are provided identical to the depicted discharge element 14, each acting as a subelement. In the configuration of the drawings, the substrate 10 is moved relative to the discharge element 14. Alternatively, the substrate 10 may be held stationary and the discharge element 14 moved to achieve the same effect.

From the discharge elements 14, electrical power leads connect a power supply 16 for energizing the discharge surfaces 20. The power supply must be capable of providing sufficient voltage to initiate arcing across the two gaps separating the substrate 10 from the discharge surfaces 20. The gap distance must be sufficient to ensure that physical contact does not occur as the substrate passes between the discharge elements. This gap dimension must accommodate tolerances in substrate width and variations in placement of the substrate as well as potential lateral motion of the substrate. Once the gap dimension is selected, the required voltage may be approximated by known calculations using the dielectric properties of air. The resultant voltage may be experimentally verified. For practical gap dimensions, a deburring potential of roughly several thousand volts is required to initiate arcing. A practical lower limit on the gap dimension is about 0.010 inch (0.254 mm). The corresponding arcing voltage is about 1500 volts required to bridge the gaps on both sides of the substrate. The shuttle and drive mechanism should be designed and controlled to limit lateral motion of the substrate during travel. Alternatively, the substrate may be physically guided. The current provided by the power supply 16 must be balanced against the burr mass to be removed and the passage time of the substrate between the discharge elements. If the substrate is moved too quickly along the deburring path 11 or the arc current is too small, the burrs will not be adequately removed. If the current is too high or the substrate is passed too slowly, arcing will remove the burrs and then damage the substrate body. For practical considerations, such as process speed and a desire for minimization of energy expended, current is generally desired to be minimized and substrate speed maximized. The total energy required to be delivered is a product of the number of burrs, their material makeup and size (as a determinant of mass). This energy, and hence the required current at a specified voltage, can be approximated by known relationships and calculations and verified by simple experimentation.

Proper selection of frequency of the power supply is also important to the distribution of energy along the substrate edge and deburring effectiveness. This is in part because current only flows during arcing. In general, the higher the frequency, the more even the distribution of energy. Using sandpaper as an analogy, higher frequency is comparable to finer grit sandpaper that removes material in very small increments. Preferably, the frequency of the voltage potential delivered to the discharge elements at least matches the average frequency of the burrs passing the discharge surfaces. As a substrate 10 is moved at a fixed speed past the discharge elements 14, the substrate edge presents a particular average frequency of burrs 24. This is a function of the average filament length in the substrate body and orientation of the filaments, which is random in typical porous metal materials used in electrode substrates. If a foam substrate is cut from a larger sheet, the manner of cutting may also affect the shape and number of burrs. If necessary, the number and spacing of burrs on a substrate edge are easily determined by visual observation. By providing an arcing current which at least matches the burr frequency, each discharge need only provide enough energy to remove a single burr. At higher frequency, the individual burrs can be incrementally eroded by multiple arcs (on average) while each arc has lower discharge energy. At lower frequency missing burrs is a risk. If instead, sufficient current (discharge) is provided to remove multiple burrs with a single arc (at arc frequency below burr frequency) the potential for damage to the substrate is increased. The above presumes that the burrs are removed during a single pass of the substrate between the discharge elements. This is most practical. The same deburring effect may be possible by reducing the frequency and/or current and making multiple passes. However, this is less desirable in a commercial setting.

EXAMPLE

To test the efficacy of the present invention, a prototype deburring device was built essentially as described in FIGS. 1 and 2a,b. The substrates to be deburred were nickel metal foam having a porosity of approximately 92 to 94 percent, a filament diameter of about 160 microns (0.160 mm) and cell size of about 80 pores per inch. The filament length, between adjacent interconnections in the foam matrix, is generally somewhat less than the pore size. A sheet substrate had previously been filled with active material and compressed from an initial thickness of 0.050 inch (1.27 mm) to a final thickness of 0.020 inch (0.51 mm). Individual electrode blanks were then die-cut from the sheet. The finished side edge dimension of the electrodes was approximately 1.5 inch (38.1 mm). Under slight magnification, the burrs on each electrode edge were counted and found to number about 100 to 200 per edge. Although the edge-to-edge resistance of the electrode blank is affected by both the compression of the sheet substrate and the active material, this has relatively small effect on the system parameters when compared with the resistance of the air gap dimension. The discharge elements were ground to obtain a curved discharge surface shape having an installed gap distance of approximately 0.080 inch (2.0 mm) from each substrate edge. The desired passage time for each electrode blank to pass between the discharge electrodes was approximately one second. This was fixed by the limitations of the otherwise unrelated components of the electrode fabrication process. The resultant specified speed of the substrates between the discharge elements was 1.5 inches per second. This was accomplished by an air cylinder driven shuttle. The power supply used was a transformer identical to those commonly used to power neon consumer advertising signs.

The capacity of the transformer was about 18,000 volts and 30 milliamperes a/c at an input of 120 percent of the local line voltage of 115 volts. A solid state frequency adjuster was used to alter frequency of the delivered deburring energy. Substrates were deburred using various adjusted deburring power frequencies between 60 and 400 cycles per seconds. It was found that optimum deburring at the above parameters was accomplished at an arcing frequency between 120 and 180 cycles per second. At this frequency range the edges were found sufficiently smooth that no improvement was perceptible at higher frequencies. The calculated voltage at initiation of arcing was approximately 12,000 volts. This initial voltage drops after arc initiation due to ionization of the air and burrs and the presence of metallic vapors in the gap. The air in the gap area was drawn off to reduce these vapors. For simplicity, the phase of the discharge voltage was not coordinated with the position of the moving burrs. Rather, the potential was supplied to the discharge electrodes and the substrates introduced at an arbitrary time. Sufficient voltage was provided to ensure initiation of arcing regardless of the position and timing of the leading burrs relative to the alternating voltage peak. After initiation of arcing, the voltage dropped as discussed above. Generally, this approach may be used.

A deburring station was constructed using the above equipment but operating, for convenience, at input line frequency of 60 cycles per second. This station was placed in line with a production electrode fabrication facility to deburr electrodes prior to assembly of cells. Several thousand substrates were successfully deburred. Successful deburring was judged by the subjectively smoother feel of the electrode edges and subsequently by the reduction in electrical shorts found in the assembled cells fabricated with the deburred electrodes. In a controlled test, cells using deburred electrodes experienced at least a 2 percent lower failure rate due to shorting from burrs. In this test, the deburring frequency of 60 cycles per second was less than the frequency of the burrs, requiring each arc to remove more than one burr on average. Although this obtained a deburring effect that was adequate in this specific test, higher frequencies are believed to be more effective with the particular electrode substrate used and may be necessary in other cell configurations.

In deburring substrates having different structures—foam metals with different pore size or different filament diameter—the system parameters will change from those in the example above. Smaller substrate pore size may result in higher number of burrs on a edge length. A larger filament diameter requires greater current or increased number of deburring discharges to completely erode the burr. The manner of forming the substrate edge may also alter the burr characteristics. It was observed that the sharpness of the cutting die affected burrs on substrates that were die-cut from sheet foam metal. A dull die may alter the burr size and number by smearing the edge of the foam metal. Deburring of nonporous substrates may also be carried out by the present methods. Solid sheet metal substrates (including those having hole patterns) may also be successfully deburred although the nature and size of the burrs will vary considerably from foam metal substrates. Similarly, sintered nickel metal substrates also commonly used in secondary cell electrodes may be deburred by these methods. Where substrates are deburred at a higher rate than one per second, a higher frequency and increased current capacity will be required to effectively deburr the same number and size burrs. For most typical commercial electrochemical cell electrodes using foam nickel substrates, the power supply described above will deliver the desired energy and power.

When using a transformer providing a continuous wave output, if the gap dimension is altered from the 0.080 inch (2.0 mm) dimension used in the above example, the arcing voltage also changes. If the gap dimension is too small, the resulting arcing voltage may be too small to provide the power necessary to remove the burrs. However, at the practical gap dimensions discussed above, effective arcing voltage will result. Other forms of power supplies applicable to the present invention are also available and will be known to those skilled in the art. Included are capacitive discharge and other power supplies capable of providing controllable noncontinuous power. Advantages that may be provided by these alternatives include voltage control independent of gap dimension. The need for frequency adjustment is determined by input power frequency and the desired deburring frequency. Alternative devices for frequency adjustment are well known to those skilled in the art. With all alternative power supplies, the ability to limit or control the discharge current to that required for deburring is an essential characteristic. Although in the figure the power supply 16 is represented by a single physical device, in the present invention the power supply may consist of multiple devices forming a power supply circuit providing the power and energy characteristics required to satisfy the objectives stated herein.

In the above example and discussions the substrate or electrode is positioned and moved to maintain the substrate or electrode equidistant from two discharge elements. This provides equal deburring effect on the two opposite edges of the substrate. In alternative embodiments, the substrate is positioned off-center, closer to one discharge element, creating two unequal gaps. Because the voltage, and hence arcing energy, is a product of the gap dimension, the substrate edge distanced further from the associated discharge element will experience a greater deburring effect. This may be used to advantage when deburring of only one edge of a substrate is required. To accomplish one-edge deburring, a discharge element would be positioned with a proper deburring gap from the path of the substrate edge to be deburred. A second discharge element is positioned as close as practical to the path of the opposite edge to reduce the gap voltage there to a minimum. The ratio of the gap dimensions should be as great as possible to reduce erosion on the non-deburred edge.

Figure 3:
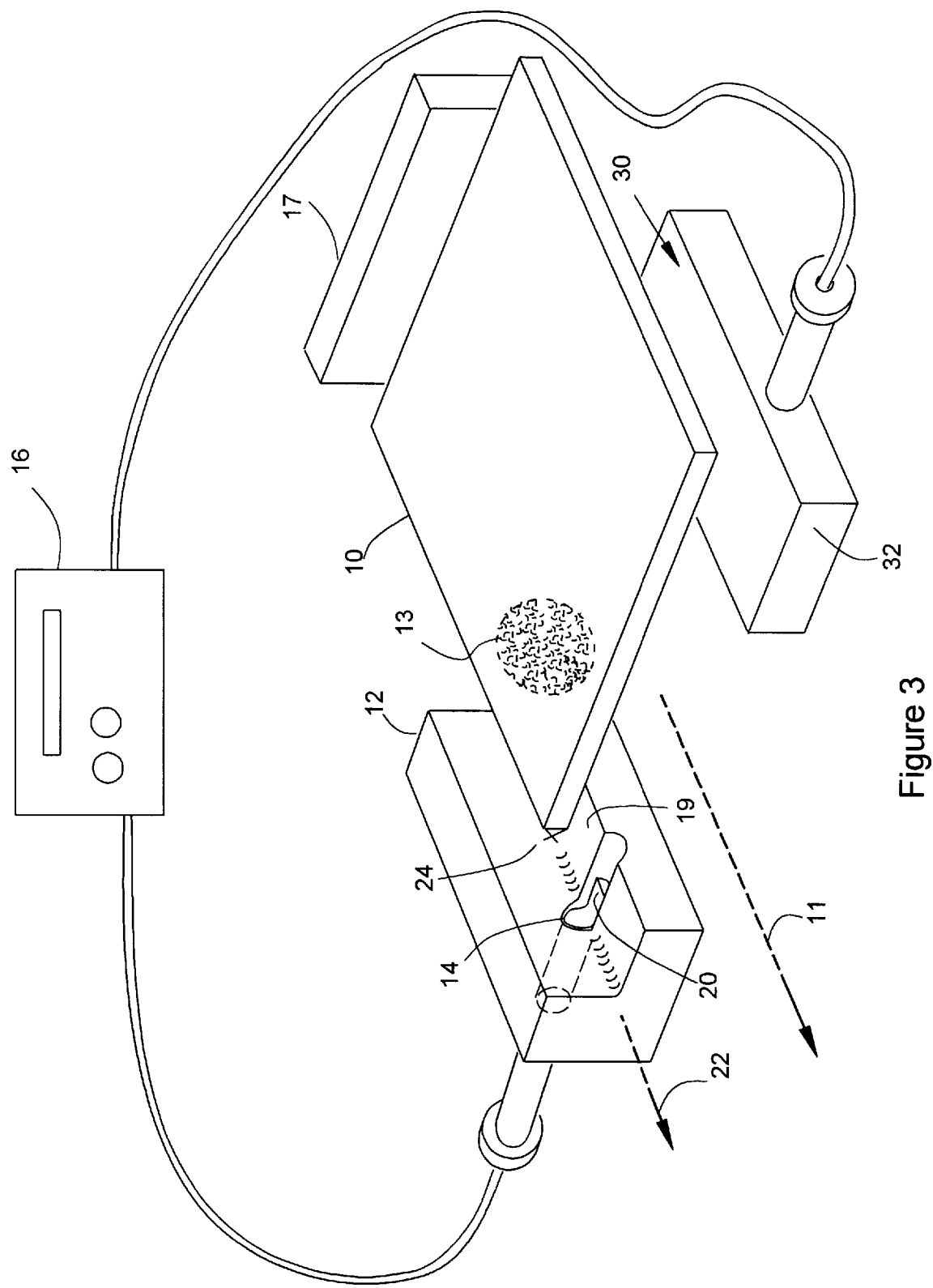
FIG. 3 is a perspective view of a deburring station employing a sliding physical contact with the substrate to effect one-edge deburring.

Although the above non-contacting methods of deburring are preferred, in alternative embodiments a physical contact with the substrate is used. In one such embodiment, the substrate or electrode is physically connected to one pole of the power supply circuit. This may be used for both two-edge and one-edge deburring. For example, regarding FIG. 1, the shuttle may be made conductive and connected to a lead of the power supply 16. The second power supply lead is then connected to one or both of the discharge elements 14. In operation, the deburring current arcs from the discharge element 14 to the substrate and then passes by physical conduction to the shuttle. Intended two-edge deburring by this method suffers from the probability of inadvertent one-sided arcing. In yet a further embodiment shown in FIG. 3, a substrate 10 is moved in constant sliding contact with a conductive contact surface 30 of a contact 32 connected to one side of the power supply. The opposite edge of the substrate is moved along a path 22 and presented to a discharge element 14 as discussed in reference to the above embodiments. The voltage required in this configuration may be reduced due to the necessity of bridging only a single gap. A physical vertical guide may be desired to stabilize the substrate's motion. In this embodiment, sufficient exposed conductive surface must be available on the substrate to ensure consistent connection with the contact surface 30. Other devices and methods of creating physical electrical connection with the substrate will be obvious to those skilled in these matters.

The preceding discussion is provided for example only. Other variations of the claimed inventive concepts will be obvious to those skilled in the art. Adaptation or incorporation of known alternative devices and materials, present and future is also contemplated. The intended scope of the invention is defined by the following claims.

I claim:

1. A method of deburring conductive electrode substrates, the method comprising:
    a. creating a high voltage electrical potential between spaced discharge elements;
    b. moving a burr-edged substrate between the spaced discharge elements such that the substrate travels proximate the discharge elements without touching the discharge elements; and
    c. forming a limited arcing current to the burrs on the substrate;
whereby substrate edges are deburred without significantly damaging the substrate.

2. The method of claim 1, wherein:
the substrate is moved between the discharge elements at a predetermined speed; and
the step of forming the arcing current comprises:
    repeatedly forming the arcing current with a frequency and discharge energy to substantially remove all the burrs on the substrate passing the discharge elements without significantly damaging the substrate; and
further comprising:
    spacing the discharge elements to provide a gap between each discharge element and the substrate edges.

3. The method of claim 2, wherein:
the frequency of the arcing current is at least the frequency of burrs passing the discharge elements at the predetermined speed.

4. The method of claim 3, wherein:
the high voltage electrical potential has a peak value of at least 1500 volts.

5. The method of claim 4, wherein:
the discharge elements are spaced to provide each said gap at least 0.010 inch between each discharge element and the substrate edges.

6. The method of claim 5, wherein:
the discharge elements are spaced to provide each said gap about 0.080 inch.

7. The method of claim 5, wherein:
repeatedly forming the arcing current further comprises:
    repeatedly forming the arcing current with a frequency in the range of about 60 to 400 cycles per second.

8. The method of claim 7, wherein:
forming the arcing current comprises:
    repeatedly forming the arcing current with a frequency in the range of about 120 to 180 cycles per second.

9. The method of claim 8, wherein:
the substrate passes between the discharge elements in a length of time of about one second.

10. The method of claim 1, further comprising;
cutting from a stock sheet of porous metal to form the conductive electrode substrate.

11. The method of claim 10, further comprising:
prior to cutting the substrate from the stock sheet, depositing an active material onto the porous metal.

12. The method of claim 2, wherein:
the act of spacing the discharge elements comprises spacing a plurality of discharge elements adjacent edge paths to provide a gap between each discharge element and the substrate edges.

13. A method of deburring electrode substrates having edge burrs, the method comprising:
    a. selecting a porous metal substrate size having a width and an average burr size;
    b. determining an average number of burrs on each substrate edge;
    c. positioning two discharge elements a distance apart greater than the substrate width;
    d. defining a passage time for the substrate to pass entirely between the discharge elements, the passage time and the average number of edge burrs defining an average burr frequency;
    e. passing the substrate along a path between, and equidistant from, the discharge elements such that a gap is formed between the substrate and the discharge elements;
    f. creating a repeating high voltage potential between the discharge elements, the potential being sufficient to initiate an electric arc across the gap, and the potential having a frequency at least as great as the burr frequency;
    g. forming an arcing discharge between the discharge elements and the substrate edge burrs, each discharge having only sufficient energy to remove a burr of average size.

14. A method of deburring conductive electrode substrates comprising:
    a. defining a gap distance;
    b. maintaining at least one discharge element a gap distance from a conductive electrode substrate;
    c. forming an arcing current between the discharge element and a burr on a substrate edge,
    d. limiting the arcing current discharge to the burr to an amount no greater than required to destroy the burr.

15. The method of claim 14, further comprising:
repeatedly forming an arcing current and distributing the total discharge energy to a multiple of burrs on the substrate edge, thereby removing the burrs while leaving the substrate essentially undamaged.

16. The method of claim 15, further comprising:
moving the substrate edge along a path a gap distance from the at least one discharge element such as to bring burrs on the substrate edge within a gap distance of the discharge element.

17. The method of claim 16, wherein:
forming an arcing current further comprises:
    forming an alternating high voltage potential in a power supply circuit; and
    applying the potential between the discharge element and the substrate.

18. The method of claim 17, further comprising:
physically connecting the substrate to the power supply circuit.

19. The method of claim 18, wherein:
physically connecting the substrate to the power supply circuit comprises:

sliding a conductive portion of the substrate in continuous contact with a conductive contact surface connected to the power supply circuit.

20. The method of claim 15, further comprising:

moving the at least one discharge element along the substrate edge to bring the at least one discharge element within a gap distance of the burrs.

21. A device for deburring electrode substrates comprising:

a first and second discharge element, the discharge elements being spaced apart a distance greater than a predetermined width of a selected substrate;

means for forming a repeating electrical discharge between the discharge elements and the edges of the selected substrate positioned between the discharge elements, and including means for limiting each discharge to no more energy than sufficient to remove a predetermined average filament burr on the substrate edge; and means for moving a substrate on a path between the discharge elements; such that when a substrate is moved between the discharge elements, electrical discharges will at least partially remove burrs existing on the substrate edges without significantly damaging the substrate body.

22. The device of claim 21, wherein:

the discharge forming means is configured to form the repeating electrical discharge at a frequency in the range of about 60 to 400 cycles per second.

23. The device of claim 22, wherein:

the discharge forming means is configured to form the repeating electrical discharge at a frequency in the range of about 120 to 180 cycles per second.

24. The device of claim 23, wherein:

each of the discharge elements has a discharge surface shaped and spaced at all points on the surface approximately equally from a substrate edge path.

25. The device of claim 24, wherein:

the means of forming the repeating electrical discharge comprises a continuous wave transformer functionally connected to the discharge elements.

26. The device of claim 21, wherein:

at least one of the discharge elements comprises a plurality of subelements.

27. In a process for fabricating secondary cell electrodes formed by the deposition of an active material on a thin conductive substrate, wherein the improvement comprises:

passing a substrate between a pair of discharge elements without touching the discharge elements;

forming a high voltage potential between the discharge elements, the potential having a frequency at least matching the frequency of substrate burrs passing the discharge elements;

such that an arcing discharge is formed between each discharge element and the substrate thereby substantially removing the burrs on the substrate without significantly damaging the substrate.

* * * * *